No. 765,500. PATENTED JULY 19, 1904.
D. C. MAYTAG.
GRADING AND SCRAPING MACHINE.
APPLICATION FILED MAY 4, 1903. RENEWED MAY 17, 1904.
NO MODEL. 2 SHEETS—SHEET 1.
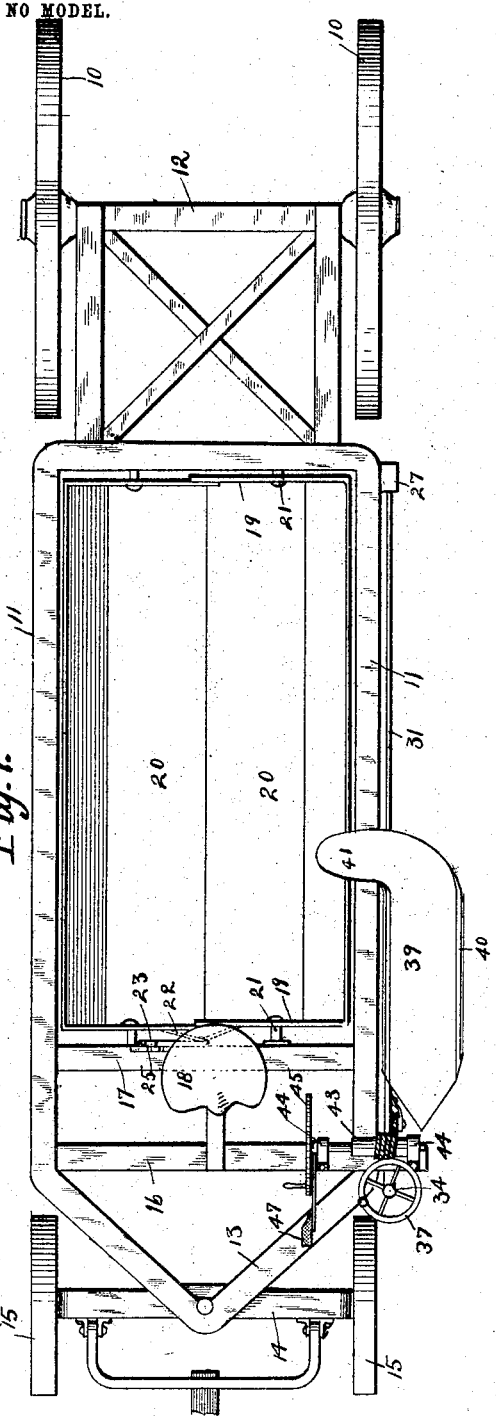
Witnesses
Inventor D. C. Maytag.
By  Att'ys No. 765,500. PATENTED JULY 19, 1904.
D. C. MAYTAG.
GRADING AND SCRAPING MACHINE.
APPLICATION FILED MAY 4, 1903. RENEWED MAY 17, 1904.
NO MODEL. 2 SHEETS—SHEET 2.

Witnesses
C. G. Hague
K. K. Keffer

Inventor L. C. Maytag
By Orwig & Lane Att'ys

No. 765,500. Patented July 19, 1904.

UNITED STATES PATENT OFFICE.

DANIEL C. MAYTAG, OF LAUREL, IOWA.

GRADING AND SCRAPING MACHINE.

SPECIFICATION forming part of Letters Patent No. 765,500, dated July 19, 1904.

Application filed May 4, 1903. Renewed May 17, 1904. Serial No. 208,471. (No model.)

*To all whom it may concern:*

Be it known that I, DANIEL C. MAYTAG, a citizen of the United States, residing at Laurel, in the county of Marshall and State of Iowa, have invented certain new and useful Improvements in Grading-Machines, of which the following is a specification.

The objects of my invention are to provide a grading-machine of simple, compact, and durable construction that will be inexpensive and of light draft and that may be readily, quickly, and easily transformed into a scraper.

A further object is to provide a machine of this class in which a dumping-wagon and means for elevating the ground into the wagon are all carried upon the same wheels, and in this connection it is my object to provide means for elevating ground into the wagon so arranged and constructed that the ground need only be elevated a very slight distance, and yet the ground may be delivered into the wagon-body, and when the wagon-bed is full the means for elevating the ground may be quickly and easily moved to an inoperative position, so that it will not in any way interfere with carrying the load of ground to a point where it may be deposited.

A further object is to provide simple and inexpensive means for adjusting the position of the ground-elevating device for dumping the wagon-box.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 3:
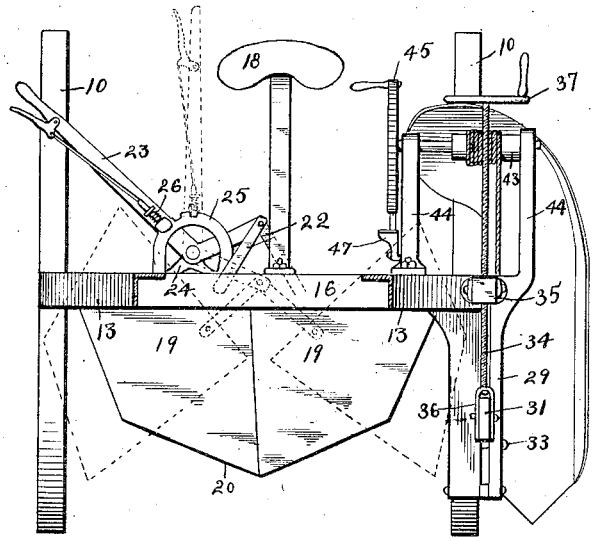
Figure 4:
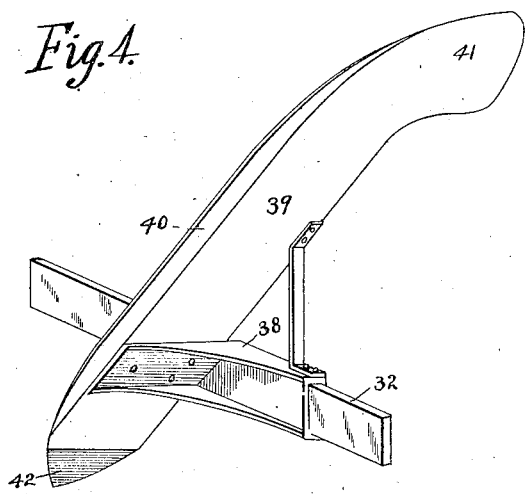

Figure 1 shows a top or plan view of the complete device. Fig. 2 shows a front elevation of same. Fig. 3 shows a front elevation of the machine with the front trucks removed. Fig. 4 shows a detail perspective view of the ground-elevating device.

Referring to the accompanying drawings, I have used the reference-numeral 10 to indicate the rear wheels. The frame 11 of the machine is substantially oblong in form and is preferably made of metal. At its rear end is an extension 12, upon which the rear wheels are mounted. At the front end of the frame 11 is an extension 13, to which the forward axle 14 is pivoted, the front wheels 15 being mounted on the axle 14, as shown.

The numeral 16 indicates a cross-piece near the front of the frame 11, and 17 indicates a second cross-piece a short distance in the rear of the cross-piece 16. Mounted on the cross-piece 16 is a driver's or operator's seat 18. The wagon-bed proper is made of metal and comprises ends and a bottom divided longitudinally into two parts. Each part has two end pieces 19 and a bottom 20, the ends being pivoted upon the pins 21, which are fixed, respectively, to the cross-piece 17 and to the rear of the frame 11. In one position the edges of the bottom are together, as shown in Figs. 1 and 3, thus forming a wagon-bed, and in their other position the edges of the bottom are widely separated, as shown in dotted lines in Fig. 3, thus permitting the contents of the bed to be discharged through the bottom. I have provided means for opening and closing the wagon-bed as follows: Attached to the adjacent corners of the forward ends 19 are the links 22. These links are both pivoted to a lever 23, fulcrumed to a bracket 24 on the cross-piece 17. Adjacent to this bracket is a segmental rack 25, and a spring-actuated pawl 26 is connected with the lever and designed to engage the segmental rack 25. The handle of the lever 23 is arranged adjacent to the seat 18, so that the operator may easily grasp the handle and by moving it toward him, as shown in Fig. 3, the sides of the wagon-bed will operate and discharge the contents thereof, and when the handle 23 is pushed away from the seat 18 the sides will be brought together and a tight wagon-bed formed, and in this position the sides of the wagon-bed are locked by the spring-actuated pawl 26. It will be noted from the accompanying drawings that the wagon-bed is comparatively long and shallow, and I have provided means for loading ground upon the wagon-bed as follows:

The reference-numeral 27 indicates a bracket having a series of openings 28 therein. This bracket 27 is arranged near the rear end of the frame 11. Near the front of said frame is a similar bracket 29, having openings 30.

The numeral 31 indicates a beam pivoted to the bracket 27 by means of a pin 32, and in this connection it is obvious that by adjusting the pin 32 in the openings 28 the rear end of the beam 31 may be raised and lowered. The forward end of the beam 31 may be made to rest upon the beam 33 in one of the openings 30 in bracket 29. However, I have provided for raising and lowering the forward end of the beam as follows:

The numeral 34 indicates a screw-threaded rod seated in a bracket 35 on the cross-piece 16. At the bottom of the rod 34 is a yoke 36, pivoted to the front end of the beam 31, and at the top of the rod 34 is a hand-wheel 37, by which the rod will be rotated and the beam raised or lowered.

The means for elevating ground into the wagon-bed comprises a frame 38, slidingly mounted upon the beam 31 and free to move longitudinally on said beam. This frame 31 supports the chute 39, having sides 40 and also having its upper end curved inwardly at 41. The lower end of the chute 39 is provided with a shovel-point 42, and the chute 39 is arranged at such an angle that as the machine is advanced over the ground-surface and as the shovel-point throws up ground into the chute the advance of the machine will cause the ground to be forced upwardly over the chute and then laterally into the wagon-bed. Obviously the depth to which the shovel-point 42 of the chute enters the ground is readily and easily controlled by the hand-wheel 37 and also by the position of the beam 32. I have provided means whereby the chute and its shovel-point may be moved longitudinally of the wagon-bed as follows:

The numeral 43 indicates a drum supported on the brackets 44 at the front of the machine. Fixed to the shaft of drum 43 is a ratchet-wheel 45, and a pawl 46, controlled by a foot-lever 47, is arranged to engage the ratchet-wheel. Wound upon the drum 43 is a cable 47, which cable passes under a direction-pulley 48 at the front of the beam 31, and the opposite end of the cable is attached to the frame 38 of the chute 39.

In practical use and assuming that it is desired to use the device for grading, and assuming, further, that the ground to be worked is comparatively hard and compact, the operator then places the pin 32 in position where the beam 31 will be supported comparatively high. He then operates the hand-wheel 37 until the point of the shovel 42 rests upon the ground-surface. Then as the machine advances over the ground the shovel-point will enter the ground and the operator continues to lower the forward end of the beam until the shovel-point forces a continuous flow of ground over the chute and into the front end of the wagon-bed. This is continued until the front end of the wagon-bed is full of ground. Then the operator releases the drum 43 by pressing upon the foot-treadle 47, and the frame 38 will then be moved rearwardly on the beam 31 a short distance, whereupon the operator releases the pawl 46, which holds the chute in its new position. The chute is permitted to remain at this point until the wagon-bed is filled directly under the end of the chute, and this movement of releasing the pawl 46 and permitting the chute to move rearwardly until the wagon-bed has been filled throughout its entire length and the chute is at is rearward limit of movement. Then the operator, by turning the hand-wheel 37, elevates the forward end of the beam 31 far enough to bring the shovel-point out of contact with the ground. He then turns the ratchet-wheel 45, thus winding up the cable 47 and throwing the chute to its forward limit of movement. Then the grading-machine is driven to the point where it is to be discharged and the operator has simply to pull the lever 23 toward him as required to dump the contents thereof. The depth to which the point 42 is permitted to enter the ground is of course controlled by the condition of the ground itself and by the ability of the draft-animals attached to the grading-machine to advance it. It is obvious that by providing a wagon-bed of this class the ground need only be elevated a very slight distance and need not be carried rearwardly any more than is necessary to provide a proper incline over which the ground may be forced by the pressure of the ground being forced on the lower end of the chute, because the entire long and shallow wagon-bed is filled throughout its entire length by the longitudinal movements of the chute 39, and said chute is moved from the front to the rear by means of its resistance against the ground-surface caused by advancing the machine with the shovel-point in the ground. Hence a small, compact, and inexpensive grading-machine is provided that may be operated with a comparatively few draft-animals.

Having thus described my invention, what I claim, and desire to secure by Letters Patent of the United States therefor, is—

1. In a machine of the class described, the combination of a frame mounted on wheels, a wagon-bed carried by the frame and a combined shovel and chute supported at one side of the wagon-bed and having its upper end shaped to discharge into the wagon-bed.

2. In a machine of the class described, the combination of a wagon-bed, supporting-wheels therefor, and a combined shovel and chute movable longitudinally of the wagon-bed discharging into the wagon-bed.

3. In a device of the class described, the combination of a wagon-bed, supporting-wheels therefor, a vertically-adjustable beam at one side of the wagon-bed, and a combined shovel and chute movable longitudinally upon said beam.

4. In a machine of the class described, the combination of a wagon-bed, supporting-wheels therefor, a beam supported at one side of the wagon-bed, vertically adjustable at both ends, a frame slidingly mounted upon said beam, means carried by the frame for elevating ground and discharging it into the wagon-bed, and means for moving said frame forwardly on the beam.

5. In a device of the class described, the combination of a wagon-bed mounted on wheels, a bracket near the rear end of the wagon-bed, a beam having its rear end supported by the said bracket and vertically adjustable therein, a screw-threaded rod connected with the forward end of said beam, a bracket in which said rod is seated, a hand-wheel for turning said rod, a frame slidingly mounted upon the beam, a combined shovel and chute carried by the frame, a drum, a draft-wheel connected with the drum, a foot-controlled pawl to engage the ratchet-wheel, and a cable wound upon the drum and connected with said sliding frame for moving it forwardly on the beam.

6. In a machine of the class described, the combination of a chute having sides, and also having its upper end inclined laterally, and a shovel-point formed on its lower end.

7. In a machine of the class described, the combination of an oblong frame, a wagon-bed composed of two mating parts, each part pivotally mounted in the wagon-frame, a lever supported on the wagon-frame, and links connecting the lever with the parts of the wagon-bed.

8. In a machine of the class described, the combination of an oblong frame, an extension at the rear end of the frame, supporting-wheels mounted on said extension, an axle pivoted to the forward end of the frame, supporting-wheels on said axle, two mating wagon-bed parts pivoted in the frame with their adjacent edges normally together at the longitudinal center of the wagon-bed, a lever fulcrumed to a suitable support, and links pivoted to the lever and to the inner portions of the wagon-bed parts, substantially as and for the purposes stated.

DANIEL C. MAYTAG.

Witnesses:
L. R. MAYTAG,
A. L. MOSER.